(12) United States Patent
Hannuksela

(10) Patent No.: US 8,078,644 B2
(45) Date of Patent: Dec. 13, 2011

(54) MEDIA STREAM RECORDING INTO A RECEPTION HINT TRACK OF A MULTIMEDIA CONTAINER FILE

(75) Inventor: Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 402 days.

(21) Appl. No.: 12/114,677

(22) Filed: May 2, 2008

(65) Prior Publication Data

US 2008/0275905 A1 Nov. 6, 2008

Related U.S. Application Data

(60) Provisional application No. 60/916,256, filed on May 4, 2007.

(51) Int. Cl.
*G06F 17/30* (2006.01)
(52) U.S. Cl. ........................................ 707/802; 707/913
(58) Field of Classification Search .................. 707/609, 707/705, 802, 913, E17.009, E17.013, E17.107
See application file for complete search history.

(56) References Cited

U.S. PATENT DOCUMENTS

| 2005/0154973 | A1 | 7/2005 | Otsuka et al. | |
|---|---|---|---|---|
| 2007/0078885 | A1 | 4/2007 | Klein, Jr. | |
| 2007/0206673 | A1* | 9/2007 | Cipolli et al. | 375/240.1 |
| 2009/0089535 | A1* | 4/2009 | Lohmar et al. | 711/173 |

FOREIGN PATENT DOCUMENTS

| EP | 1 653 466 A | 5/2006 |
|---|---|---|
| EP | 1 686 728 A | 8/2006 |
| WO | WO2007/078253 A2 * | 7/2007 |

OTHER PUBLICATIONS

International Search Report for PCT Application No. PCT/IB2008/051711.
Korean Office Action for Korean Patent Application No. 2009-7025336, dated Mar. 25, 2011.
English Translation of Korean Office Action for Korean Patent Application No. 2009-7025336, dated Mar. 25, 2011.
Office Action for Chinese Patent Application No. 200880014703.2, dated Sep. 7, 2011.
English Translation of Office Action for Chinese Patent Application No. 200880014703.2, dated Sep. 7, 2011.

* cited by examiner

*Primary Examiner* — Fred I Ehichioya
(74) *Attorney, Agent, or Firm* — AlbertDhand LLP

(57) ABSTRACT

A system and method for storing received real-time media streams into a multimedia container file. Media content is recorded into a file according to a file format that provides instructions for constructing the media packets. At least one received media packet is represented in the file using the instructions for constructing media packets. The at least one received media packet in the file is also associated with an indication that it may contain errors.

13 Claims, 7 Drawing Sheets

MEDIA STREAM RECORDING INTO A RECEPTION HINT TRACK OF A MULTIMEDIA CONTAINER FILE

FIELD OF THE INVENTION

The present invention relates generally to the multimedia container file format. More particularly, the present invention relates to the use and processing of reception hint tracks in the multimedia container file format.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The multimedia container file format is an important element in the chain of multimedia content production, manipulation, transmission and consumption. In this context, the coding format (i.e., the elementary stream format) relates to the action of a specific coding algorithm that codes the content information into a bitstream. The container file format comprises mechanisms for organizing the generated bitstream in such a way that it can be accessed for local decoding and playback, transferring as a file, or streaming, all utilizing a variety of storage and transport architectures. The container file format can also facilitate the interchanging and editing of the media, as well as the recording of received real-time streams to a file. As such, there are substantial differences between the coding format and the container file format.

The hierarchy of multimedia file formats is depicted generally at 1000 in FIG. 1. The elementary stream format 1100 represents an independent, single stream. Audio files such as .amr and .aac files are constructed according to the elementary stream format. The container file format 1200 is a format which may contain both audio and video streams in a single file. An example of a family of container file formats 1200 is based on the ISO base media file format. Just below the container file format 1200 in the hierarchy 1000 is the multiplexing format 1300. The multiplexing format 1300 is typically less flexible and more tightly packed than an audio/video (AV) file constructed according to the container file format 1200. Files constructed according to the multiplexing format 1300 are typically used for playback purposes only. A Moving Picture Experts Group (MPEG)-2 program stream is an example of a stream constructed according to the multiplexing format 1300. The presentation language format 1400 is used for purposes such as layout, interactivity, the synchronization of AV and discrete media, etc. Synchronized multimedia integration language (SMIL) and scalable video graphics (SVG), both specified by the World Wide Web Consortium (W3C), are examples of a presentation language format 1400. The presentation file format 1500 is characterized by having all parts of a presentation in the same file. Examples of objects constructed according to a presentation file format are PowerPoint files and files conforming to the extended presentation profile of the 3GP file format.

Available media and container file format standards include the ISO base media file format (ISO/IEC 14496-12), the MPEG-4 file format (ISO/IEC 14496-14, also known as the MP4 format), Advanced Video Coding (AVC) file format (ISO/IEC 14496-15) and the 3GPP file format (3GPP TS 26.244, also known as the 3GP format). There is also a project in MPEG for development of the scalable video coding (SVC) file format, which will become an amendment to advanced video coding (AVC) file format. In a parallel effort, MPEG is defining a hint track format for file delivery over unidirectional transport (FLUTE) and asynchronous layered coding (ALC) sessions, which will become an amendment to the ISO base media file format.

The Digital Video Broadcasting (DVB) organization is currently in the process of specifying the DVB file format. The primary purpose of defining the DVB file format is to ease content interoperability between implementations of DVB technologies, such as set-top boxes according to current (DVT-T, DVB-C, DVB-S) and future DVB standards, Internet Protocol (IP) television receivers, and mobile television receivers according to DVB-Handheld (DVB-H) and its future evolutions. The DVB file format will allow the exchange of recorded (read-only) media between devices from different manufacturers, the exchange of content using USB mass memories or similar read/write devices, and shared access to common disk storage on a home network, as well as other functionalities. The ISO base media file format is currently the strongest candidate as the basis for the development of the DVB file format. The ISO file format is the basis for the derivation of all the above-referenced container file formats (excluding the ISO file format itself). These file formats (including the ISO file format itself) are referred to as the ISO family of file formats.

The basic building block in the ISO base media file format is called a box. Each box includes a header and a payload. The box header indicates the type of the box and the size of the box in terms of bytes. A box may enclose other boxes, and the ISO file format specifies which box types are allowed within a box of a certain type. Furthermore, some boxes are mandatorily present in each file, while other boxes are simply optional. Moreover, for some box types, there can be more than one box present in a file. Therefore, the ISO base media file format essentially specifies a hierarchical structure of boxes.

FIG. 2 shows a simplified file structure according to the ISO base media file format. According to the ISO family of file formats, a file 200 includes media data and metadata that are enclosed in separate boxes, the media data (mdat) box 210 and the movie (moov) box 220, respectively. For a file to be operable, both of these boxes must be present. The media data box 210 contains video and audio frames, which may be interleaved and time-ordered. The movie box 220 may contain one or more tracks, and each track resides in one track box 240. For the presentation of one media type, typically one track is selected.

It should be noted that the ISO base media file format does not limit a presentation to be contained in only one file. In fact, a presentation may be contained in several files. In this scenario, one file contains the metadata for the whole presentation. This file may also contain all of the media data, in which case the presentation is self-contained. The other files, if used, are not required to be formatted according to the ISO base media file format. The other files are used to contain media data, and they may also contain unused media data or other information. The ISO base media file format is concerned with only the structure of the file containing the metadata. The format of the media-data files is constrained by the ISO base media file format or its derivative formats only in that the media-data in the media files must be formatted as specified in the ISO base media file format or its derivative formats.

In addition to timed tracks, ISO files can contain any non-timed binary objects in a meta box. The meta box can reside at the top level of the file, within a movie box 220, and within a track box 240, but at most one meta box may occur at each of the file level, the movie level, or the track level. The meta box is required to contain a 'hdlr' box, indicating the structure or format of the 'meta' box contents. The meta box may contain any number of binary items that can be referred, and each one of the binary items can be associated with a file name.

A file may be compatible with more than one format in the ISO family of file formats, and it is therefore not always possible to speak in terms of a single "type" or "brand" for the file. All ISO files contain a file type box indicating which file format specifies the "best use" of the file and also a set of other specifications with which the file complies. The format that is the "best use" of the file is referred to as the major brand of the file, while the other compatible formats are referred to as compatible brands.

The presence of a brand in the list of the compatible brands of the file type box constitutes both a claim and a permission. The presence is a claim in that the file conforms to all the requirements of that brand, and the presence also represents a permission to a reader implementing potentially only that brand to read the file. In general, readers are required to implement all features documented for a brand unless one of the following applies:

1. The media the readers are using do not use or require a feature. For example, I-frame video does not require a sync sample table, and if composition re-ordering is not used, then no composition time offset table is needed. Similarly, if content protection is not needed, then support for the structures of content protection is not required.

2. Another specification with which the file is conformant forbids the use of a feature. For example, some derived specifications explicitly forbid the use of movie fragments.

3. The context in which the product operates means that some structures are not relevant. For example, hint track structures are only relevant to products preparing content for, or performing, file delivery (such as streaming) for the protocol in the hint track.

File readers implementing a certain brand should attempt to read files that are marked as compatible with that brand.

A hint track is a special track which usually does not contain media data. Instead, a hint track contains instructions for packaging one or more tracks for delivery over a certain communication protocol. The process of sending packets is time-based, substantially identical to the display of time-based data, and is therefore suitably described by a track. Due to the presence of hint tracks, the operational load of a sender can be reduced, and the implementation of a sender can be simply compared to a sender constructing protocol data units from media samples without any hints.

The ISO base media file format contains the hint track definition for Real-Time Protocol (RTP) and Secure Real-Time Transport Protocol (SRTP) protocols, and an upcoming Amendment 2 of the ISO base media file format will contain the hint track definition for FLUTE and ALC protocols. A hint track format for MPEG-2 transport stream (TS) may also be specified, e.g., as part of the DVB File Format.

The mdat box depicted in FIG. 2 contains samples for the tracks. In non-hint tracks, a sample is an individual frame of video, a time-contiguous series of video frames, or a time-contiguous compressed section of audio. In hint tracks, a sample defines the formation of one or more packets formatted according to the communication protocol identified in the header of the hint track.

Hint tracks inherit all of the features of regular media tracks, such as timing of the samples and indication of synchronization samples. Hint samples contain instructions to assist a sender to compose packets for transmission. These instructions may contain immediate data to send (e.g., header information) or reference segments of the media data. In other words, the media samples in media tracks do not need to be copied into the samples of the hint tracks, but rather the hint samples point to the samples of the media tracks. Therefore, the media data itself does not need to be reformatted in any way. This approach is more space-efficient than an approach that requires media information to be partitioned into the actual data units that will be transmitted for a given transport and media format. Under such an approach, local playback requires either re-assembling the media from the packets or having two copies of the media—one for local playback and one for transport. Similarly, the transmission of such media over multiple protocols using this approach requires multiple copies of the media data for each delivery protocol. This is inefficient with space unless the media data has been heavily transformed for transport (e.g., by the application of error-correcting coding techniques or by encryption).

If an ISO file contains hint tracks, the media tracks that reference the media data from which the hints were built remain in the file, even if the data within them is not directly referenced by the hint tracks. After deleting all hint tracks, the entire un-hinted presentation remains.

FIG. 3 is a representation of a general video communications system. Due to the fact that uncompressed video requires a huge bandwidth, input video 300 is compressed by a source coder 305 to a desired bit rate. The source coder 305 can be divided into two components—a waveform coder 310 and an entropy coder 315. The waveform coder 310 performs lossy video signal compression, while the entropy coder 315 converts the output of the waveform coder 310 into a binary sequence losslessly. A transport coder 320 encapsulates the compressed video according to the transport protocols in use by interleaving and modulating the data, for example. The data is transmitted to the receiver side via a transmission channel 325. The receiver performs inverse operations to obtain reconstructed video signal for display. The inverse operations include the use of a transport decoder 330 and a source decoder 335 which can be divided into an entropy decoder 340 and a waveform decoder 345, ultimately resulting in output video 350.

Most real-world channels are susceptible to transmission errors. Transmission errors can be roughly classified into two categories—bit errors and erasure errors. Bit errors are caused by physical events occurring in the transmission channel, such as noise and interference. Protocol stacks for real-time media transport typically provide mechanisms such as cyclic redundancy check (CRC) codes for detecting bit errors. It is a common practice to discard erroneous protocol payloads in the transport decoder. The challenges in decoding of erroneous video data lie in the likelihood of bursty bit errors, the exact detection of the position of the error, and variable length coding (VLC) used by the entropy coder. Due to the burstiness of bit errors, it is likely that a large portion of a protocol payload would be non-decodable anyways, and therefore discarding the entire protocol payload does not cause very much unnecessary data exclusion. The error detection mechanisms provided by the communication protocols are typically able to yield a binary conclusion—either the packet is corrupted or it is correct. It is therefore up to source coding layer mechanisms to determine the exact location of errors. Even though there are methods based on syntactic and semantic violations and unnatural texture disruptions for detecting the location of errors, the false detection of bit errors may lead to subjectively annoying video. Due to variable length coding, a single bit error is likely to change the interpretation of the codeword in which it occurs and cause a loss of synchronization of subsequent codewords. Even if codeword synchronization were re-established, it might not be possible to determine the spatial or temporal location of decoded data.

In terms of erasure errors, there are two primary sources of such errors. First, queue overflows in congested network elements, such as routers, cause packet losses. Second, the transport decoder typically processes bit errors by removing the entire packets in which the bit errors occurred.

In general, introduced transmission errors should first be detected and then corrected or concealed by the receiver. As explained above, bit errors are typically detected using CRC or similar codes and corrupted packets are discarded. Communication protocols for real-time media transport typically attach a sequence number that is incremented by one for each transmitted packet, and therefore packet losses can be detected from a gap in the sequence number values of consecutive packets. Error correction refers to the capability to recover the erroneous data perfectly as if no errors would have been introduced in the first place. Error concealment refers to the capability to conceal the impacts of transmission errors so that they should be hardly visible in the reconstructed video. Typically, some amount of redundancy is added to source or transport coding in order to help in error detection, correction and concealment.

Error correction and concealment techniques can be roughly classified into three categories—forward error concealment, error concealment by postprocessing and interactive error concealment. Forward error concealment refers to those techniques in which the transmitter side adds such redundancies to the transmitted data so that the receiver can easily recover the transmitted data even if there were transmission errors. Error concealment by postprocessing is totally receiver-oriented. These methods attempt to estimate the correct representation of erroneously received data. The transmitter and the receiver may also co-operate in order to minimize the effect of transmission errors. These methods utilize heavily the feedback information given by the receiver. Error concealment by postprocessing is also referred to as passive error concealment, while the other two categories represent forms of active error concealment.

An orthogonal classification of error correction and concealment algorithms, compared to the categorization introduced above, is based on the protocol stack layer in which the algorithm in question operates. Methods in the physical layer may, for example, use modulation intelligently or interleave data bits to be transmitted. In the link layer, erroneously received data blocks may by selectively retransmitted, for instance. In general, the methods involving the source coder or the source decoder are referred to as media-aware error correction and concealment algorithms, while methods that operate solely in the transport coder and decoder are media-independent. Methods requiring the interoperation of several protocol stack layers fall into the category of cross-layer optimization algorithms. The term "joint source-channel coding" is used when source and transport coding operate seamlessly to tackle transmission errors as a joint effort.

For many real-time multimedia communication applications, it is desirable to not have a multimedia file transmitted as a file, but instead have the media data encapsulated into packets of a communication protocol. Furthermore, it is desirable for existing media players to be capable of parsing, decoding, and playing any multimedia file that is generated from received media streams. If any recorded multimedia file can be played by existing media players, the media players do not have to be updated or changed.

Most, if not all, container file formats are targeted for the playing of error-free files that are reliably transferred to the playing device and/or for providing media content for transmission in streaming servers or other sending devices. Consequently, the container file formats do not provide mechanisms for indicating transmission errors, and it is not guaranteed that existing players would be able to cope with erroneous media streams gracefully. Instead, such players may crash or behave otherwise in unexpected ways. It would therefore be desirable that files generated from received media streams be played with existing media players and would be compatible with existing file formats. Furthermore, it would be desirable for sophisticated players and decoders to include mechanisms for efficiently concealing transmission errors from received streams that are recorded to a file.

There have been a number of conventional approaches for addressing at least some of the issues identified above. In a first approach, the received transport stream is included as such in the file, or the transport stream is stored in a separate file, and the separate file is referred to from the presentation file (i.e., the file containing the metadata). In this arrangement, the transport stream refers to the lowest protocol stack layer that is considered relevant in the application. For RTP-based media transmission, the transport stream typically refers to a stream of RTP packets. When elementary media streams are encapsulated to an MPEG-2 transport stream (as in DVB-T, DVB-C, and DVB-S), the transport stream refers to the MPEG-2 transport stream. In the ISO base media file format structure, the transport stream can be included as a single sample into the media track. This is how MPEG-2 transport streams are included in QuickTime files. Metadata specific to the transport stream may be stored in a new structure of the file format; in the ISO base media file format, the structure may reside in the meta box.

In a second approach, the received transport stream is converted to elementary data tracks. Metadata specific to the transport stream is stored in a new structure of the file format; in the ISO base media file format, the structure resides in the metabox.

In a third approach, received transport packets of a stream are written as such to a hint track of the file that is recorded. However, the use of a hint track is not a valid solution logically, as hint tracks provide packetization instructions for a server or, more generally, for a sender. Moreover, a recorded hint track may not provide a valid stream to be re-sent. For example, RTP sequence numbers are required to be continuous in a transmitted stream, but in a recorded stream a missing packet causes a discontinuity in RTP sequence numbers.

The fact that the moov box can be completed only after all of the media data is received makes continuous recording to a single file impossible in the second and third approaches discussed above. This problem can be avoided when the movie fragment feature is used to segment the recorded file as described in U.S. patent application Ser. No. 11/292,786, filed Dec. 1, 2005. Alternatively, the media data of the received streams can be recorded to separate files compared to the meta data. However, if simultaneous time-shifted playback of the file being recorded is desired, then movie fragments as described in U.S. patent application Ser. No. 11/292,786 should be used.

SUMMARY OF THE INVENTION

Various embodiments of the present invention provide a system and method for receiving a media packet stream and recording the media content. The media content is recorded into a file according to a file format that provides instructions for constructing the media packets. At least one received media packet is represented in the file using the instructions for constructing media packets. The at least one received media packet in the file is also associated with an indication that it may contain errors.

Various embodiments of the present invention provide a backward-compatible mechanism to store received real-time media streams into a multimedia container file. In practice, this means that existing players can correctly play the recoverable parts of the received streams. The identification and localization of transmission errors in the received streams is enabled, and sophisticated players can therefore efficiently conceal transmission errors. Furthermore, various embodiments of the present invention serve to avoid duplication of any media data in a recorded file. Various embodiments of the present invention can be used in conjunction with virtually all receivers recording to the DVB file format.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Various embodiments of the present invention provide a system and method for receiving a media packet stream and recording the media content. The media content is recorded into a file according to a file format that provides instructions for constructing the media packets. At least one received media packet is represented in the file using the instructions for constructing media packets. The at least one received media packet in the file is also associated with an indication that it may contain errors.

According to one embodiment of the present invention, streams are recorded to one or more hint tracks of a file format, and it is specifically indicated in the hint track that the hint track is generated from received streams. The hint tracks accurately correspond to the received streams and therefore provide a media player with all a mechanism for handling transmission errors as efficiently as possible. For example, the sample structure (i.e., the packet structure) of the hint tracks contains the sequence number of the packet, from which a missing packet can be identified. If the RTP hint track structures of the ISO base media file format were re-used for the reception hint tracks of various embodiments of the present invention, the sequence number would reside in the RTP sequenced syntax element of the RTP packet data structure.

According to a second embodiment of the present invention, received streams are converted to valid media tracks, i.e. such tracks that can be decoded without non-standardized transmission error detection and handling mechanisms. The creation of valid media tracks guarantees that existing media players can play the recorded file. One or more specific hint tracks are also created. Whenever possible, a hint sample contains references to the samples of the media tracks rather than a copy of the packet payload, thereby reducing the storage space requirements for the file.

The creation of a valid media track may sometimes cause the omission of some packets altogether. For example, when a reference picture in a coded video stream is lost, the media track should skip any pictures directly or indirectly predicted from the lost reference picture. A hint sample may therefore contain a copy of a packet payload that is not present in the corresponding media track.

Figure 1:
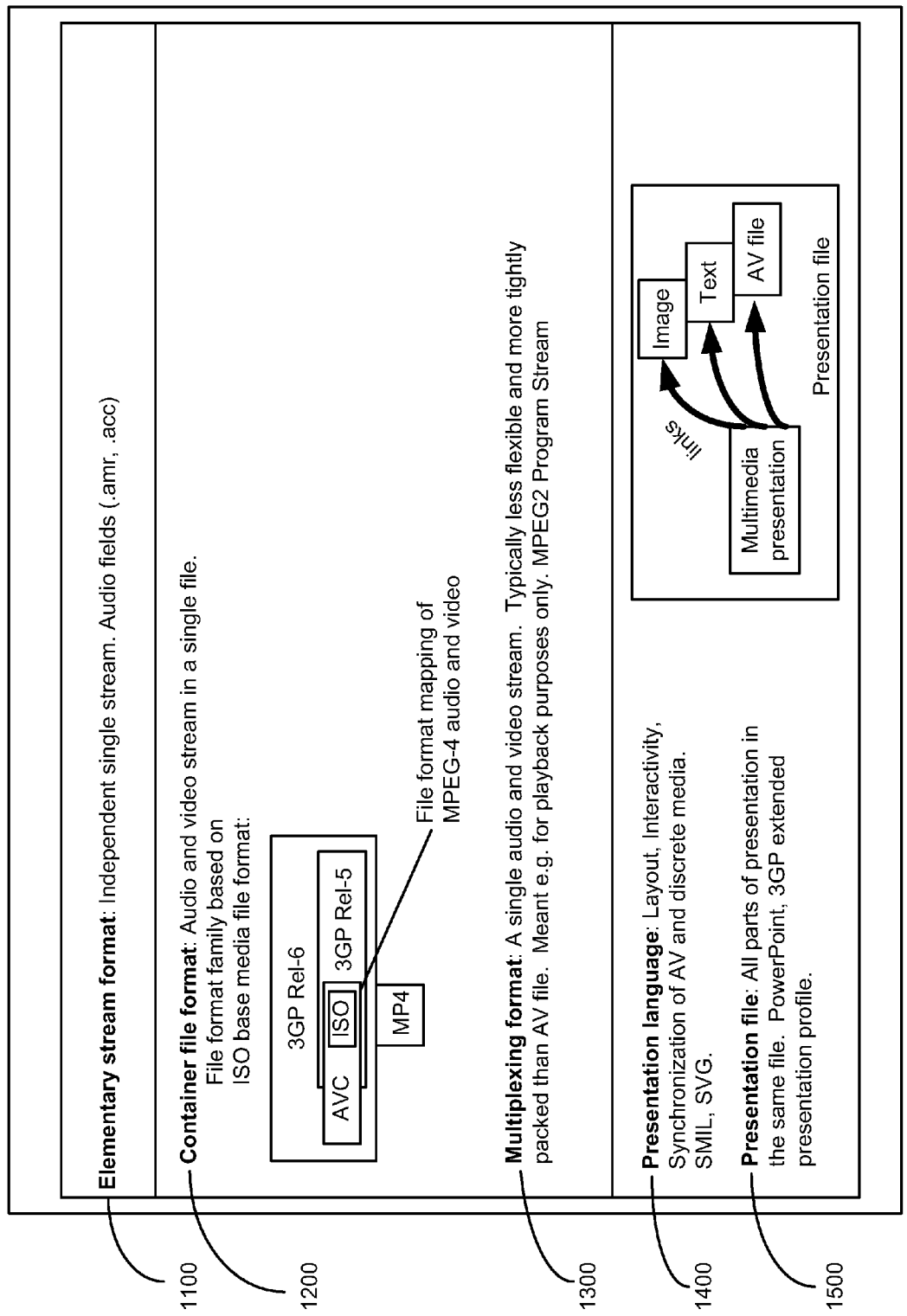
FIG. 1 is a depiction of the hierarchy of multimedia file formats.
Figure 2:
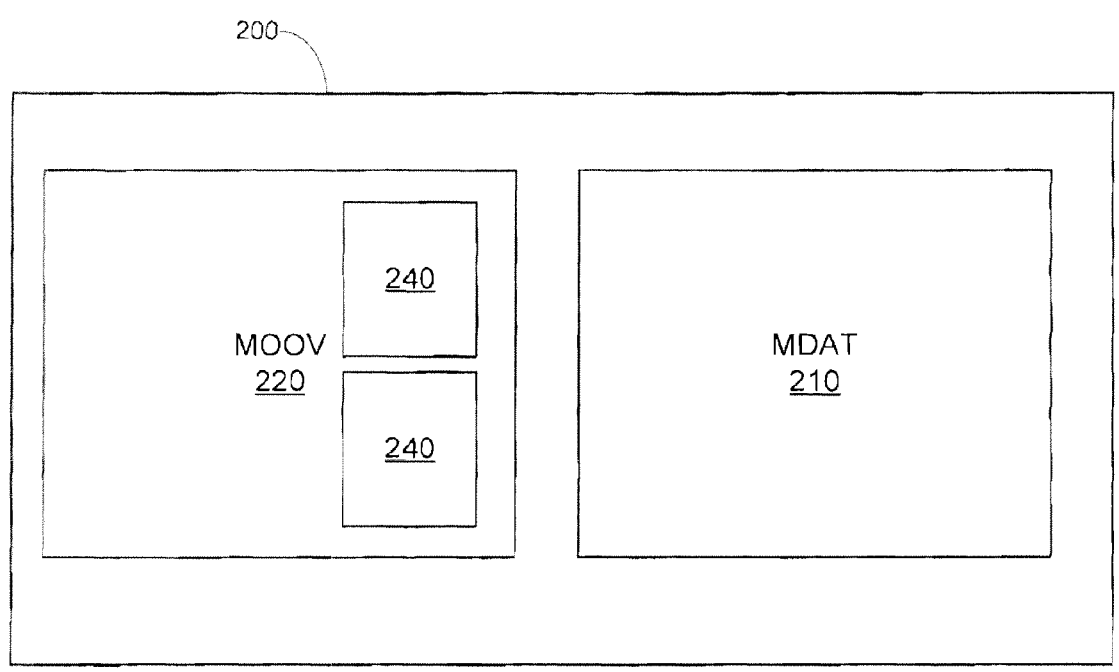
FIG. 2 is a representation of a simplified structure of an ISO file.
Figure 3:
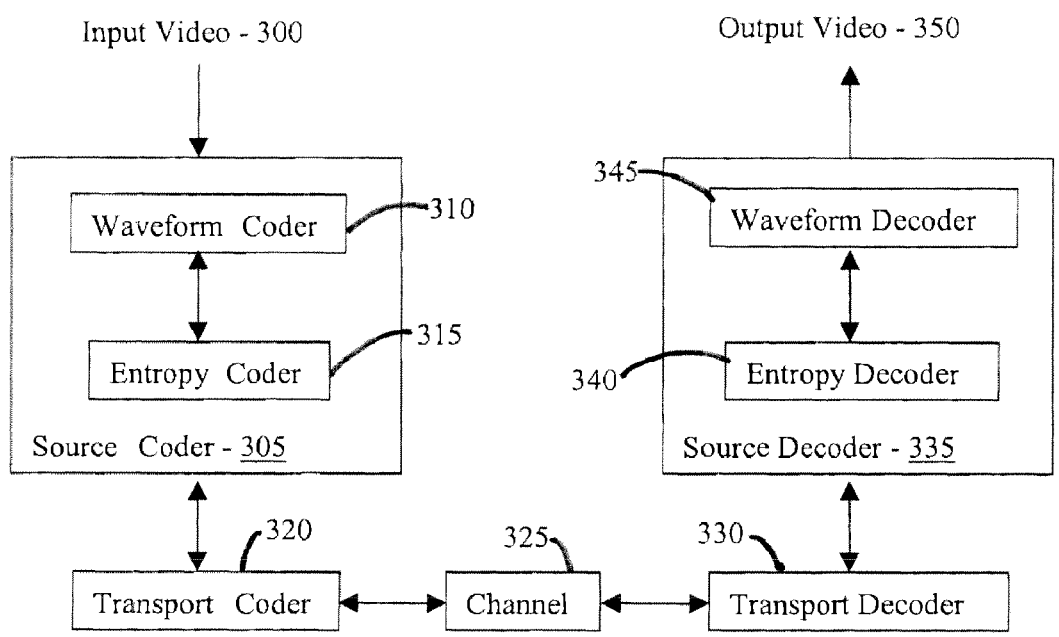
FIG. 3 is a representation of a general video communications system.
Figure 4:
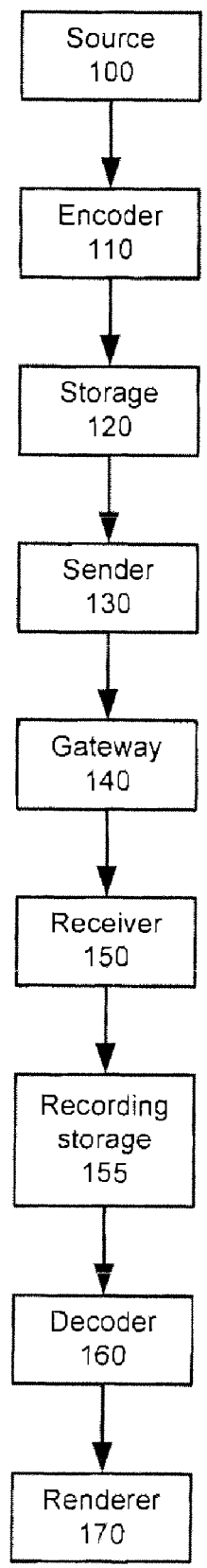
FIG. 4 is a representation of a generic multimedia communications system for use with various embodiments of the present invention.

FIG. 4 is a graphical representation of a generic multimedia communication system within which various embodiments of the present invention may be implemented. As shown in FIG. 4, a data source 100 provides a source signal in an analog, uncompressed digital, or compressed digital format, or any combination of these formats. An encoder 110 encodes the source signal into a coded media bitstream. It should be noted that a bitstream to be decoded can be received directly or indirectly from a remote device located within virtually any type of network. Additionally, the bitstream can be received from local hardware or software. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 4 only one encoder 110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the server 130 may reside in the same physical device or they may be included in separate devices. The encoder 110 and server 130 may operate with live real-time content, in which case the coded media bitstream is typically not stored permanently, but rather buffered for small periods of time in the content encoder 110 and/or in the server 130 to smooth out variations in processing delay, transfer delay, and coded media bitrate.

The server 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 130 encapsulates the coded media bitstream into packets. For example, when RTP is used, the server 130 encapsulates the coded media bitstream into RTP packets according to an RTP payload format. Typically, each media type has a dedicated RTP payload format. It should be again noted that a system may contain more than one server 130, but for the sake of simplicity, the following description only considers one server 130.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer or an RTP translator and typically acts as an endpoint of an RTP connection.

The system includes one or more receivers 150, typically capable of receiving, de-modulating, and de-capsulating the transmitted signal into a coded media bitstream. The coded media bitstream is transferred to a recording storage 155. The recording storage 155 may comprise any type of mass memory to store the coded media bitstream. The recording storage 155 may alternatively or additively comprise computation memory, such as random access memory. The format of the coded media bitstream in the recording storage 155 may be an elementary self-contained bitstream format, or one or more coded media bitstreams may be encapsulated into a container file. If there are many coded media bitstreams, such as an audio stream and a video stream, associated with each other, a container file is typically used and the receiver 150 comprises or is attached to a container file generator producing a container file from input streams. Some systems operate "live," i.e. omit the recording storage 155 and transfer coded media bitstream from the receiver 150 directly to the decoder 160. In some systems, only the most recent part of the recorded stream, e.g., the most recent 10-minute excerption of the recorded stream, is maintained in the recording storage 155, while any earlier recorded data is discarded from the recording storage 155.

The coded media bitstream is transferred from the recording storage 155 to the decoder 160. If there are many coded media bitstreams, such as an audio stream and a video stream, associated with each other and encapsulated into a container file, a file parser (not shown in the figure) is used to decapsulate each coded media bitstream from the container file. The recording storage 155 or a decoder 160 may comprise the file parser, or the file parser is attached to either recording storage 155 or the decoder 160.

The codec media bitstream is typically processed further by a decoder 160, whose output is one or more uncompressed media streams. Finally, a renderer 170 may reproduce the uncompressed media streams with a loudspeaker or a display, for example. The receiver 150, recording storage 155, decoder 160, and renderer 170 may reside in the same physical device or they may be included in separate devices.

The following is an implementation of how to indicate recorded hint tracks in the ISO base media file format. In this implementation, the recorded hint tracks are indicated with a sample entry type that is different from the corresponding sample entry intended for server hint tracks. For example, RTP hint tracks intended for the server are hint tracks (media handler "hint"), with an entry-format in the sample description of "rtp". A recorded RTP hint track is with "rrtp" entry-format in the sample description. Both sample entries are specified identically as follows:

```
class RtpHintSampleEntry( ) extends SampleEntry ('rtp ') {
    uint(16) hinttrackversion = 1;
    uint(16) highestcompatibleversion = 1;
    uint(32) maxpacketsize;
    box additionaldata[ ];
}
class ReceivedRtpHintSampleEntry( ) extends SampleEntry ('rrtp') {
    uint(16) hinttrackversion = 1;
    uint(16) highestcompatibleversion = 1;
    uint(32) maxpacketsize;
    box additionaldata[ ];
}
```

A pair of server and recorded sample entry formats is specified for each protocol that can be hinted, such as a SRTP and MPEG-2 transport stream (TS). The hint sample may be identically specified for each pair of server and recorded hint track formats for any protocol. Identical definition of the hint sample format in each pair of server and recorded hint track formats for any protocol may, for example, reduce the size of a software implementation in terms lines of code of a programming language or number of machine-executable instructions. However, it may also be beneficial to specify the sample format for the recorded hint track differently compared to the server hint track format of the same protocol. For example, it may not be reasonable to include the continuity_counter field of the MPEG-2 TS packet header for the server hint sample format, as servers are supposed to simply increment the value by 1 (in modulo arithmetic) per each transmitted packet. However, the continuity_counter field is needed for the receorded hint sample format, as packet losses can be concluded from a gap of the continuity_counter values of subsequent received packets. Furthermore, it may be reasonable to specify recorded hint track formats in a protocol stack layer different from the layer used in the server hint track. For example, if a recorded hint sample corresponded to an Internet Protocol (IP) packet, a file parser could use the checksum of the User Datagram Protocol (UDP) header to conclude the presence of bit errors in the received packet, i.e., the integrity of the received packet. Alternatively or complementarily, the recorded hint sample may contain fields that are not present in the corresponding packet format. Such fields may be used to convey information from underlying protocol stack layers, for instance. One example of such a field can be a bit error indicator field for a recorded RTP hint sample. The receiver can set the bit error indicator field based on the UDP checksum or any CRC codes or checksums present in any underlying protocol stack layer.

Figure 5:
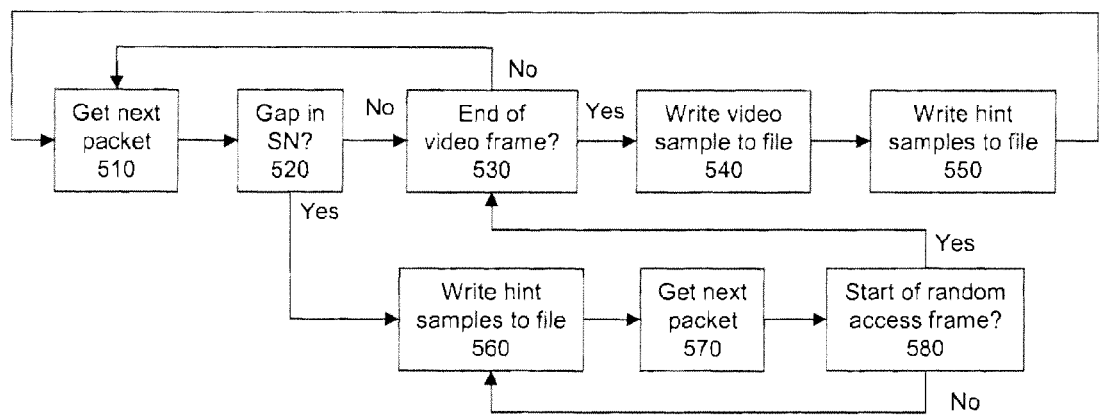
FIG. 5 is a flow chart showing the operation of a simplified version of a receiver in accordance with various embodiments of the present invention.

FIG. 5 is a flow chart showing the operation of a simplified version of a receiver in accordance with various embodiments of the present invention. However, it should be noted that the receiver can take a variety of forms and configurations. The process of FIG. 5 begins with a transport packet being fetched at 510 from the recipient's buffer for received transport packets. In addition, the transport packet is written to a second buffer, herein referred to as a short-term packet buffer. The transport packet may comprise an RTP packet, an MPEG-2 transport stream packet, or a packet of any other transport protocol. At 520, the continuity of the packet sequence numbering is checked, with a determination being made as to whether there is a gap in sequence numbering. If the transport packets are formatted according to RTP, the sequence number (SN) resides in the RTP header. If the transport packets are formatted according to an MPEG-2 transport stream, the sequence number is called the continuity_counter and resides in the TS packet header.

If the are no gaps in sequence numbering and none of the packets in the short-term packet buffer were identified to contain bit errors, then at 530 there is a check as to whether the current packet contains the last payload bytes for the video frame or, more generally, for a video access unit for which the packets are currently stored in the short-term packet buffer. In most video RTP payloads, the M bit of the RTP header is specified to indicate that the packet contains the last payload bytes for the coded video frame. Another way to detect the last packet of a video frame is to check the RTP timestamp of the next packet. If the next RTP timestamp differs from the current RTP timestamp, then the current packet contains the last payload bytes of the current coded video frame. When encapsulation into MPEG-2 transport stream is in use, a payload_unit_start_indicator value equal to 1 in the next transport stream packet indicates that the current TS packet contains the last payload bytes of the current coded video frame. If the current packet is not the last packet of the video frame, the process returns to 510. It should be noted that processes 520 and 530 only operate if the transmission order is identical to the decoding order of the coded video data. Loss and end-of-frame detection for interleaved transmission order typically requires an analysis of received data units. An example of loss detection for interleaved transmission of H.264/AVC video is provided in section 8 of 3GPP Technical Recommendation 26.946 (Release 6), "Multimedia Broadcast/Multicast Service, User service guidelines." Frame boundary detection is specified in section 7.4.1.2.4 of H.264/AVC (i.e. ITU-T Recommendation H.264).

Additionally, it is noted that the above discussion with reference to FIG. 5 is described in terms of a video stream. Audio is typically not temporally predicted over a number of frames, and usually an entire audio frame is included in one transport packet. Consequently, the portion of the above process addressing the seeking of a next random access frame can usually be omitted in audio streams. Furthermore, if an audio frame always fits into one transport packet, writing, process 530 can be omitted and step 540 can be modified to replace missing audio frames with empty frames when writing audio samples into the file.

If the current packet is the last packet of a coded video frame, then a video sample is derived from the packet payloads collected in the short-term packet buffer at 540. The derivation process can comprise a simple concatenation of the packet payloads. The generated video sample is then written to a file. It should be noted that, due to metadata (moov box or moof box) typically preceding the media data in the appearance order, the video sample may be written to a temporary file first and copied to the actual file being created once all of corresponding metadata is completed.

At 550, a hint sample is generated from each one of the packets stored in the short-term packet buffer. As the video sample generated at 540 already contains the coded video data, the hint samples simply refers to the video track, the generated video sample, and the appropriate byte range within the video sample. When hint samples have been generated for all of the packets in the short-term packet buffer, the buffer is emptied and the process returns to 510.

If a gap in packet sequence numbering or a bit error in any of the packets in the short-term packet buffer is detected at 520, then a hint sample is generated from each of the packets stored in the short-term packet buffer at 560. However, as the packet payloads in the short-term packet buffer are not error-free, no video sample is generated into the video track. Thus, the packet payloads are essentially included in the hint samples using either the immediate constructor mechanism or the "fat" hint track mechanism. When immediate constructors are used, a copy of the payload data is included in the packetization instructions. When a "fat" hint track is in use, the packet payloads are included in the mdat section for the hint track and are referred to from the constructors of the hint track. When hint samples have been generated for all packets in the short-term packet buffer, the buffer is emptied.

After 560, the next packet is obtained from the recipient's buffer for received transport packets at 570. The next packet is then examined to determine whether the packet starts a coded video frame providing a random access point to the stream. The start of a coded video frame can be detected according to process 530. The detection of a random access point depends on the video format and its payload format. For example, in H.264/AVC, the independent decoding refresh (IDR) frame can be identified from the network abstraction layer (NAL) unit header, which is easily accessible from the packet payload. Another random access point indication mechanism provided by H.264/AVC is the recovery point supplemental enhancement information (SEI) message, which can indicate different types of gradual random access positions. Another example of random access point indications is included in the RTP payload format for the VC-1 codec, which includes a specific flag for this purpose. If a random access point is indicated, the process continues at 530. Otherwise, the process continues at 560.

It should be noted that the process described above may be implemented in a number ways. For example, it is possible for no media tracks to be created during the reception process, with only the hint tracks being created for the file. The media tracks can then be created off-line, after the reception of the streams is over. During the off-line generation of the media tracks, the hint samples (containing the media payload data) may or may not be changed to refer to the data in the samples for the media tracks. Referring to FIG. 4, the off-line generation of media tracks would result into two additional blocks getting their input from the recording storage 155 and outputting to the decoder 160. The first block in processing order can be referred to as a file re-writer, which inputs a file containing the hint tracks only (without the presence of media tracks) and outputs the file with media tracks. The second block in processing order can be referred to as a second recording storage, which may have similar properties to the recording storage 155.

Another implementation involves recording to an intermediate format during reception. The intermediate format can comprise a simple storage format for the received packets.

For example, an MPEG-2 transport stream can be stored as such to a file, and RTP packets can be stored when some framing indicating the size of the packets is also included into the file. The file according to the intermediate format can later be converted to a more structured file format, such as a version or derivative of the ISO base media file format. During the conversion process, an operation similar to that described above may be used. Referring to FIG. 4, this implementation would require two additional blocks getting their input from the recording storage 155 and outputting to the decoder 160. The first block in processing order can be referred to as a file re-writer, which inputs a file according to the intermediate format and outputs the file according to a more structured file format. The second block in processing order can be referred to as a second recording storage, which may have similar properties to the recording storage 155.

The file re-writer and the second recording storage referred to above may reside in the same device as the receiver 150, the recording storage 155, the decoder 160, or a different device. Moreover, the file re-writer and the second recording storage may reside in the same device or different devices from each other.

A file parser included in or attached to the decoder 160 and the decoder 160 may operate as if an ordinary file is parsed and decoded, i.e., as if only the media tracks and media samples are parsed and decoded, while the hint tracks and hint samples are omitted. Alternatively, the file parser and the decoder 160 may operate as if a coded media bitstream were received in real-time. In other words, the file parser can construct packets according to the instructions in the hint samples and pass the packets to the decoder 160. Furthermore, the pace at which the packets are passed to the decoder 160 can correspond to the reception schedule of the packets. The format of the packets can be identical to the packets transmitted from the sender 130, or it can include essentially the same pieces of information as the packets transmitted from the sender, potentially accompanied with data from underlying protocol stacks. The decoder 160 detects missing or corrupted packets as described above with reference to FIG. 5. The decoder 160 may respond to missing or corrupted packets by applying error concealment and/or error tracking algorithms. Moreover, the decoder may request for the recovery or concealment of the missing or corrupted packets with a feedback protocol from the sender 130. Other arrangements of the file parser and the decoder 160 are also possible. For example, the decoder 160 may conclude if a packet is correctly or incorrectly decodable if its data is contained in a media sample of a media track or in a hint sample, respectively.

It should also be noted that a hint track may contain one or more media streams/types and may also contain associated metadata. For example, if audio and video are carried as elementary streams over an MPEG-2 transport stream, the audio and video can be recorded into the same hint track. Moreover, the MPEG-2 specific signaling can also be included into the same hint track.

It should further be noted that there are encryption/DRM systems that operate in the transport domain, i.e. can encrypt packets or packet payloads independently or as a stream of packets in contrast to coded media frames, for example. If the provided DRM usage rights deny storage of the content in decrypted format, then the recipient does not reproduce the media tracks, instead only storing the received packets in the special hint track.

Communication devices incorporating and implementing various embodiments of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 6:
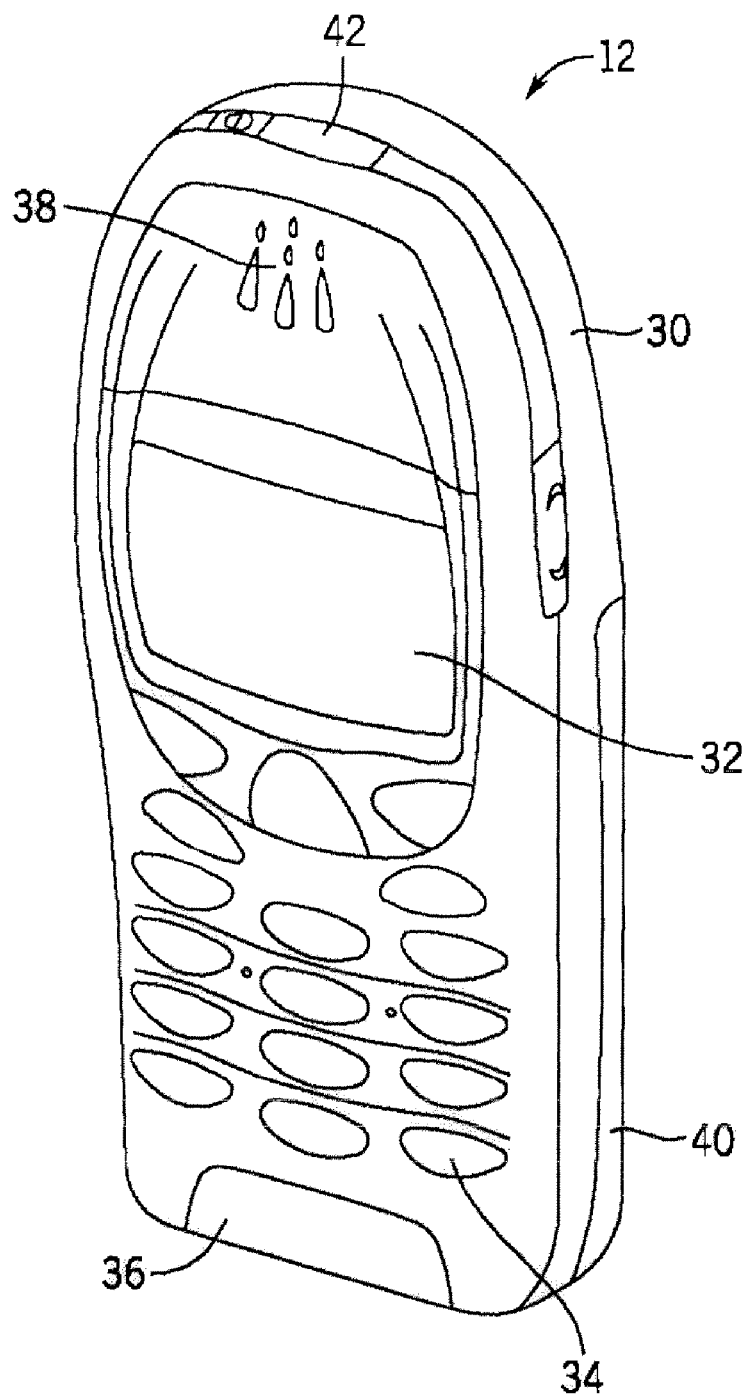
FIG. 6 is a perspective view of an electronic device that can be used in conjunction with the implementation of various embodiments of the present invention.
Figure 7:
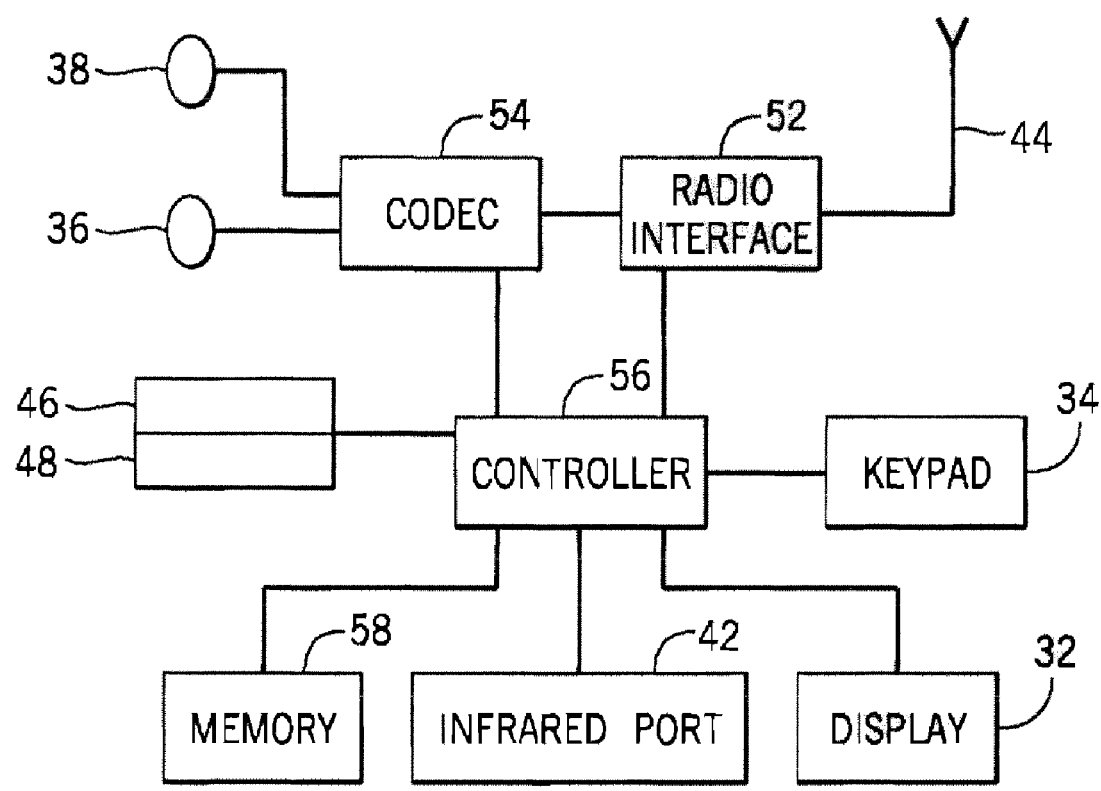
FIG. 7 is a schematic representation of the circuitry which may be included in the electronic device of FIG. 6.

FIGS. 6 and 7 show one representative electronic device 12 within which the present invention may be implemented. It should be understood, however, that the present invention is not intended to be limited to one particular type of electronic device 12. The electronic device 12 of FIGS. 6 and 7 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56, a memory 58 and a battery 80. Individual circuits and elements are all of a type well known in the art, for example in the Nokia range of mobile telephones.

The various embodiments of the present invention described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

What is claimed is:

1. A method, comprising:
   receiving a media packet stream including media content; and
   recording the media content into a file according to a file format that provides instructions for constructing media packets,
   wherein at least one media packet in the received media packet stream is represented in a hint sample of at least one hint track in the file, and wherein the hint sample comprises an indication indicating whether the at least one media packet contains errors,
   wherein the hint sample comprises an indication of loss of at least one packet in the media packet stream; and
   wherein each hint sample representing media packets after the loss of at least one packet until the next random access point in the media content is reached indicates that the media content contains errors.

2. The method of claim 1, that file format is a version of the ISO base media file format, and wherein the instructions for constructing the media packets are included in hint samples of at least one hint track.

3. The method of claim 1, wherein the file format provides a structure for media frames, and wherein at least one received media frame is represented in the file with the structure for media frames.

4. The method of claim 3, wherein the file format is a version of the ISO base media file format, wherein the instructions for constructing media packets are included in hint samples of at least one hint track, and wherein the structure for media frames is a media sample of media track.

5. A computer-readable medium having a computer program stored thereon, the computer program comprising instructions operable to cause a processor to perform any one of the method of claim 1.

6. The method of claim 1, wherein the errors represent at least one of bit-errors and packet losses during transmission of the media packet stream.

7. An apparatus, comprising:
   a processor; and
   a memory unit communicatively connected to the processor and including:
      computer code for processing a received media packet stream including media content; and
      computer code for recording the media content into a file according to a file format that provides instructions for constructing media packets,
   wherein at least one media packet in the received media packet stream is represented in a hint sample of at least one hint track in the file, and wherein the hint sample comprises an indication indicating whether the at least one media packet contains errors,
   wherein the hint sample comprises an indication of loss of at least one packet in the media packet stream; and
   wherein each hint sample representing media packets after the loss of at least one packet until the next random access point in the media content is reached indicates that the media content contains errors.

8. The apparatus of claim 7, that file format is a version of the ISO base media file format, and wherein the instructions for constructing the media packets are included in hint samples of at least one hint track.

9. The apparatus of claim 7, wherein the file format provides a structure for media frames, and wherein at least one received media frame is represented in the file with the structure for media frames.

10. The apparatus of claim 9, wherein the file format is a version of the ISO base media file format, wherein the instructions for constructing media packets are included in hint samples of at least one hint track, and wherein the structure for media frames is a media sample of a media track.

11. The apparatus of claim 7, wherein the errors represent at least one of bit-errors and packet losses during transmission of the media packet stream.

12. An apparatus, comprising a processor configured to:
    process a received media packet stream including media content; and
    record the media content into a file according to a file format that provides instructions for constructing media packets,
    wherein at least one media packet in the received media packet stream is represented in a hint sample of at least one hint track in the file, and wherein the hint sample comprises an indication indicating whether the at least one media packet contains errors,
    wherein the hint sample comprises an indication of a loss of at least one packet in the media packet stream; and
    wherein each hint sample representing media packets after the loss of at least one packet until the next random access point in the media content is reached indicates that the media content contains errors.

13. The apparatus of claim 12, wherein the errors represent at least one of bit-errors and packet losses during transmission of the media packet stream.

* * * * *